United States Patent
Chang et al.

(10) Patent No.: US 11,854,497 B2
(45) Date of Patent: Dec. 26, 2023

(54) DISPLAY APPARATUS, METHOD FOR COMPENSATING FOR DATA SIGNAL THEREOF, AND METHOD FOR GENERATING DEEP LEARNING-BASED COMPENSATION MODEL

(71) Applicants: LG DISPLAY CO., LTD., Seoul (KR); INDUSTRY-UNIVERSITY COOPERATION FOUNDATION HANYANG UNIVERSITY, Seoul (KR)

(72) Inventors: Joon-Hyuk Chang, Paju-si (KR); Kwanghwan Ji, Paju-si (KR); Kwan-Ho Park, Paju-si (KR); Kiseok Chang, Paju-si (KR); Junghoon Seo, Paju-si (KR); Kipyo Hong, Paju-si (KR); Hyojung Park, Paju-si (KR); Seunghyuck Lee, Paju-si (KR)

(73) Assignees: LG Display Co., Ltd., Seoul (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 18/012,550

(22) PCT Filed: Jun. 21, 2021

(86) PCT No.: PCT/KR2021/007751
§ 371 (c)(1),
(2) Date: Dec. 22, 2022

(87) PCT Pub. No.: WO2021/261859
PCT Pub. Date: Dec. 30, 2021

(65) Prior Publication Data
US 2023/0252946 A1 Aug. 10, 2023

(30) Foreign Application Priority Data
Jun. 24, 2020 (KR) .................. 10-2020-0077033

(51) Int. Cl.
G09G 3/3291 (2016.01)
G06N 3/08 (2023.01)
G09G 3/3266 (2016.01)

(52) U.S. Cl.
CPC ............. G09G 3/3291 (2013.01); G06N 3/08 (2013.01); G09G 3/3266 (2013.01);
(Continued)

(58) Field of Classification Search
CPC ............... G09G 3/3291; G09G 3/3233; G09G 3/3266; G06N 3/08
See application file for complete search history.

(56) References Cited

U.S. PATENT DOCUMENTS

2015/0002378 A1 1/2015 Nathan et al.
2017/0004753 A1* 1/2017 Kim ..................... G09G 3/3233

FOREIGN PATENT DOCUMENTS

JP 2018-194719 A 12/2018
JP 2018-205557 A 12/2018
(Continued)

OTHER PUBLICATIONS

Oh, K. et al., "A Luminance Compensation Method Using Optical Sensors with Optimized Memory Size for High Image Quality AMOLED Displays," Journal of the Optical Society of Korea, Oct. 2016, pp. 589-592, vol. 20, No. 5.
(Continued)

Primary Examiner — Sardis F Azongha
(74) Attorney, Agent, or Firm — Fenwick & West LLP

(57) ABSTRACT

The present invention relates to a display apparatus that allows a compensated data voltage to be supplied to each pixel by compensating for the data voltage so as to prevent burn-in from occurring in a display panel, a method for compensating a data signal thereof, and a method for generating a deep learning-based compensation model. To implement same, the present invention provides the display apparatus comprising a timing controller having mounted therein the compensation model generated by learning, in a deep learning method, the temperature, time, average brightness, and data voltage for each pixel. Accordingly, the (Continued)

present invention has an effect of preventing burn-in from occurring in each pixel by supplying each pixel with the compensated data voltage generated via the compensation model.

15 Claims, 10 Drawing Sheets

(52) U.S. Cl.
CPC ............... *G09G 2310/0289* (2013.01); *G09G 2310/08* (2013.01); *G09G 2320/046* (2013.01); *G09G 2360/16* (2013.01)

(56) References Cited

FOREIGN PATENT DOCUMENTS

| KR | 10-2020-0026421 A | 3/2020 |
| KR | 10-2020-0041969 A | 4/2020 |

OTHER PUBLICATIONS

PCT International Search Report and Written Opinion, PCT Application No. PCT/KR2021/007751, dated Oct. 1, 2021, 10 pages (with English translation of PCT International Search Report).

\* cited by examiner

Input

$F_N$ : frame number $N$ : total number of frames $h$ : height of pixels for frames (1080p)

$w$ : width of pixels for frames (1920p)

$B_p$ : brightness of $p$th pixel

Output

$t_p$ : operating time of $p$th pixel $\bar{B}_p$ : average brightness of $p$th pixel initialization

$p = 0;\ t_p = 0;\ \bar{B}_p = 0;$ while $F_N < N$ do
    for $p < (h \times w)$ do
        $\bar{B}_p\mathrel{+}= B_p;$
        if $B_p = 0$ then
            $t_p = t_p;$ //time doesn't count when the pixel isn't operating
        else
            $t_p\mathrel{+}= 1;$ //time counts when the pixel is operating
        end
    end
end
$\bar{B}_p = \bar{B}_p / N;$

FIG. 6

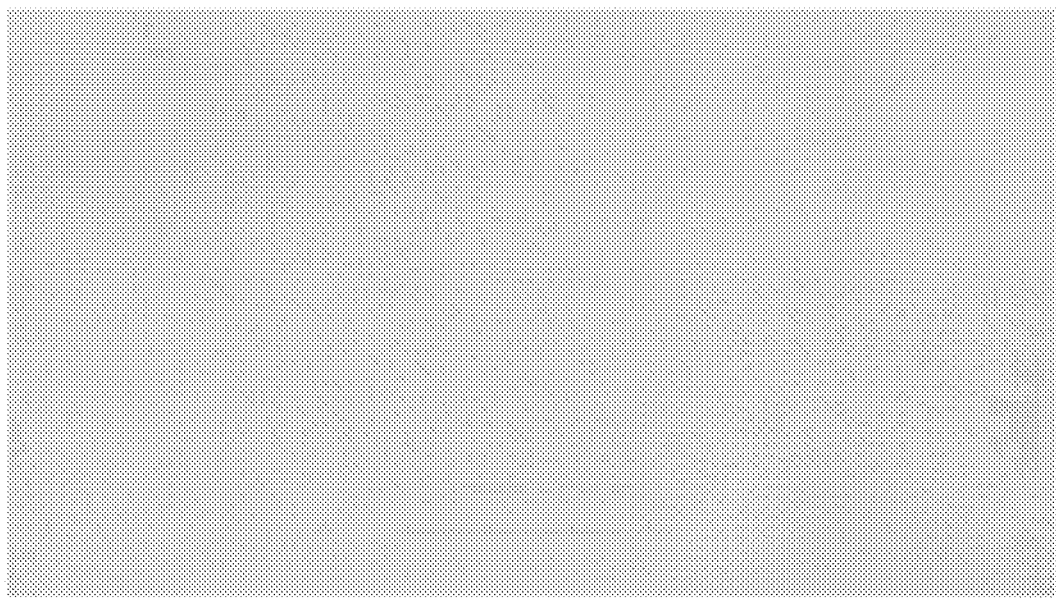
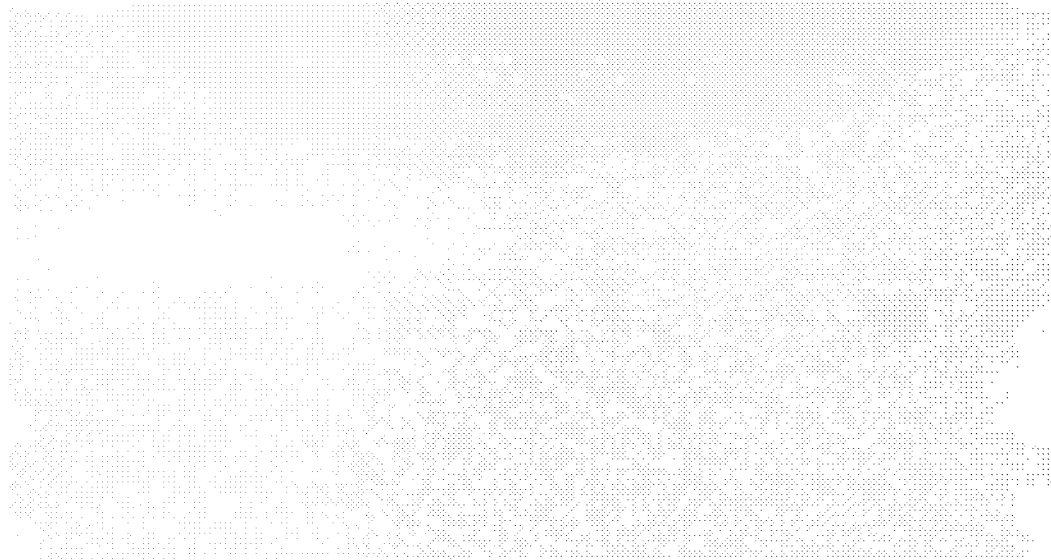
FIG. 10

DISPLAY APPARATUS, METHOD FOR COMPENSATING FOR DATA SIGNAL THEREOF, AND METHOD FOR GENERATING DEEP LEARNING-BASED COMPENSATION MODEL

FIELD

The present disclosure relates to a display device that compensates data voltage so that burn-in does not occur in an organic light-emitting display (OLED) panel and then supplies the compensated data voltage, and a data signal compensation method in the display device, and a deep-learning-based compensation model generation method.

DESCRIPTION OF RELATED ART

In general, an organic light-emitting display device has an organic light-emitting diode (OLED) which is provided in a display panel thereof and has high luminance and low operating voltage and is of a self-luminous type element which emits light by itself. Therefore, the organic light-emitting display device has a high contrast ratio, and may realize an ultra-thin display. The organic light-emitting display device has a response time of several microseconds, and thus may easily implement moving images, and has no limitation in terms of a viewing angle, and has stable characteristics at low temperatures.

The organic light-emitting diode (OLED) has an anode electrode connected to a drain electrode of a driving thin-film transistor D-TFT, a cathode electrode connected to ground VSS, and an organic light-emitting layer formed between the cathode electrode and the anode electrode.

In the organic light-emitting display device as described above, when data voltage Vd is applied to a gate electrode of the driving thin-film transistor, a drain-source current flows according to a gate-source voltage Vgs. The drain-source current becomes current flowing in the organic light-emitting diode. This organic light-emitting display device controls an amount of current flowing through the organic light-emitting diode using the driving thin-film transistor so as to display a grayscale of an image.

DISCLOSURE

Technical Purpose

However, although the organic light-emitting display device is a next-generation display device with excellent performance, the organic light-emitting display device have a fatal disadvantage of burn-in phenomenon. The burn-in phenomenon may occur due to an operation scheme of the OLED. In the OLED device, a TFT element mounted in each pixel controls an amount of current applied to the OLED element to control brightness of the self-emitting OLED element. In general, the TFT element that drives the OLED element is sensitive to a temperature. Properties of the TFT elements may vary from pixel to pixel due to a high temperature emitted from the OLED and may be affected by a use time of the OLED, and an average brightness thereof. This may lead to variation in an driving voltage of the TFT-OLED. As a result, there is a difference between brightness of pixels of the same display panel. This is defined as the burn-in phenomenon of the OLED and causes deterioration of image quality over time.

Conventionally, in order to solve this burn-in phenomenon, an internal compensation scheme that compensates for the TFT property deviation using a circuit technique in a pixel circuit was employed. Alternatively, an external compensation scheme was used in which an independent circuit is installed out of the panel, and electron mobility and threshold voltage of the TFT are sensed, and based on the sensing result, the independent circuit additionally compensates for insufficient TFT driving voltage that needs to be applied to the OLED in order to output the uniform brightness of the OLED and supplies the compensated voltage to the TFT.

Further, conventionally, a scheme of measuring luminance of the OLED with an optical sensor, calculating the insufficient voltage, and applying an additional voltage to the TFT based on the calculation result, thereby suppressing the OLED burn-in phenomenon.

The conventional schemes for suppressing the OLED burn-in phenomenon have a problem in that the compensation circuit is mounted to a specific element and thus needs to be modified when the element is changed, thereby requiring a lot of money and time.

Further, there is a problem in that the element deteriorates due to long-term use of the product, and thus when an initial value of the element is changed or the internal circuit is damaged, the performance was greatly reduced.

In addition, various sensors and elements for sensing are required to constitute the external compensation circuit. Thus, there is a problem in that it is difficult to miniaturize the product, and also a problem in that the manufacturing cost is high because expensive elements are used.

Accordingly, in order to solve the above-mentioned problems, the inventors of the present disclosure have invented a display device including a timing controller including a micro-chip equipped with a compensation model generated by learning a temperature, time, average brightness, and data voltage for each pixel in a deep learning scheme.

Further, the inventors of the present disclosure have invented a data signal compensation method in a display device in which when a data voltage is applied to a data driver from the timing controller including the micro-chip in which the compensation model is mounted, the compensation model generates a compensated data voltage obtained by compensating the data voltage such that the burn-in is prevented from occurring in each pixel, and then the compensated data voltage is applied to each pixel via the data driver.

Further, the inventors of the present disclosure have invented a deep-learning-based compensation model generation method in a display device in which video data, time and temperature are input into a computer simulator, and then, the computer simulator calculates, based on the video data input thereto, an average brightness value, a weighted time, TFT threshold voltage shift, electron mobility, applied data voltage and initial data voltage related to each pixel and learns these data using a deep learning scheme and generates a compensation model that compensates the applied data voltage and outputs a compensated data voltage obtained by compensating the applied data voltage.

Purposes of the present disclosure are not limited to the above-mentioned purpose. Other purposes and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

Technical Solution

The present disclosure may provide a display device according to an embodiment. The display device includes a display panel in which a plurality of gate lines and data lines are disposed to intersect each other, and each pixel is defined at each of intersections therebetween. T timing controller applies a scan signal to the plurality of gate lines through a gate driver, and applies a data signal to the plurality of data lines through a data driver. The timing controller includes a micro-chip equipped with a compensation model generated by learning a temperature, a weighted time, an average brightness, an applied data signal, and an initial data signal related to each pixel in a deep learning scheme. The micro-chip inputs the data signal to the compensation model to generate a compensated data signal, and the timing controller applies the generated compensated data signal to the data driver.

Further, the present disclosure may provide a data signal compensation method in a display device according to an embodiment. In the display device, the timing controller transmits the data signal to the micro-chip, the micro-chip inputs the data signal to the compensation model to generate the compensated data signal, and the timing controller applies the generated compensated data signal to the data driver. The data driver applies the compensated data signal to the plurality of data lines.

Further, the present disclosure may provide a method for generating a compensation model for a display device in a deep-learning manner according to an embodiment. In the method, a computer simulator receives video data, a temperature and time data, and analyzes each frame of the video data based on each of color pixels (R, G, and B), and calculates a per-pixel average brightness, and generates data including a weighted time, a threshold voltage shift of a thin-film transistor (TFT), an electron mobility, an applied data voltage, and an initial data voltage related to each pixel, using the per-pixel average brightness. Then, the computer simulator learns the generated data in the deep learning manner to generate a compensation model, wherein the model is configured to compensate the applied data voltage so that burn-in does not occur in each pixel to generate a compensated data voltage, and to output the compensated data voltage.

Technical Effect

According to an embodiment of the present disclosure, the timing controller is equipped with the microchip equipped with the compensation model generated by learning the temperature, the weighted time, the average brightness, the applied data signal, and the initial data signal related to each pixel in the deep learning scheme. Thus, the compensated data voltage generated via the compensation model is supplied to each pixel, thereby preventing the burn-in phenomenon from occurring in each pixel.

Thus, in accordance with the present disclosure, the display device may compensate for deviation in an OLED display at low cost.

Further, according to the present disclosure, a compensation circuit that may maintain display performance regardless of element and circuit variations as long as the video data and collected data related to TFT of each pixel are available may be implemented.

Further, according to an embodiment of the present disclosure, the timing controller has the micro-chip equipped with the compensation model. Thus, it is not necessary to modify an entire circuit in order to compensate the data voltage. Thus, it is advantageous that a lot of money and time is not required.

Further, according to an embodiment of the present disclosure, because the timing controller has the micro-chip equipped with the compensation model, only the micro-chip may be separately replaced when properties of the element have been changed due to long-time use of the product. This may prevent change of the initial value of the element or damage to the internal circuit and thus a significant drop in performance is prevented.

Further, according to an embodiment of the present disclosure, the timing controller has the compensation model and thus it is not necessary to configure an external compensation circuit. Thus, various sensors and elements for sensing are not required, so the product may be miniaturized.

Further, according to an embodiment of the present disclosure, since it is not necessary to use expensive elements to compensate the data voltage, there is an advantage that the manufacturing cost is not high.

Further, according to the present disclosure, the display device has the micro-chip equipped with the compensation model. A viewer may view the image on displays of various sizes, such as smartphones and small displays, in addition to TV.

Further, the deep-learning-based software method according to the present disclosure may be applied to the display device. Thus, a very simple and low-cost scheme compared to a conventional scheme using an external compensation circuit may be achieved. Thus, the burn-in phenomenon of the OLED panel may be removed with a simple circuit and chip.

The effect of the present disclosure is not limited to the above-mentioned effects, and another effect not mentioned will be clearly understood by those skilled in the art from the following description.

In addition to the above-described effects, specific effects of the present disclosure will be described together while explaining specific details for carrying out the disclosure below.

BRIEF DESCRIPTION OF DRAWINGS

FIG. 6 is a diagram showing an example of an algorithm using which a simulator calculates an operation time and average brightness of each pixel according to an embodiment of the present disclosure.

FIG. 10 is a diagram showing an image of an OLED luminance value reflected on a white screen, wherein each of reduced data voltage and corrected data voltage is converted into the OLED luminance value, according to an embodiment of the present disclosure.

DETAILED DESCRIPTIONS

Figure 1:
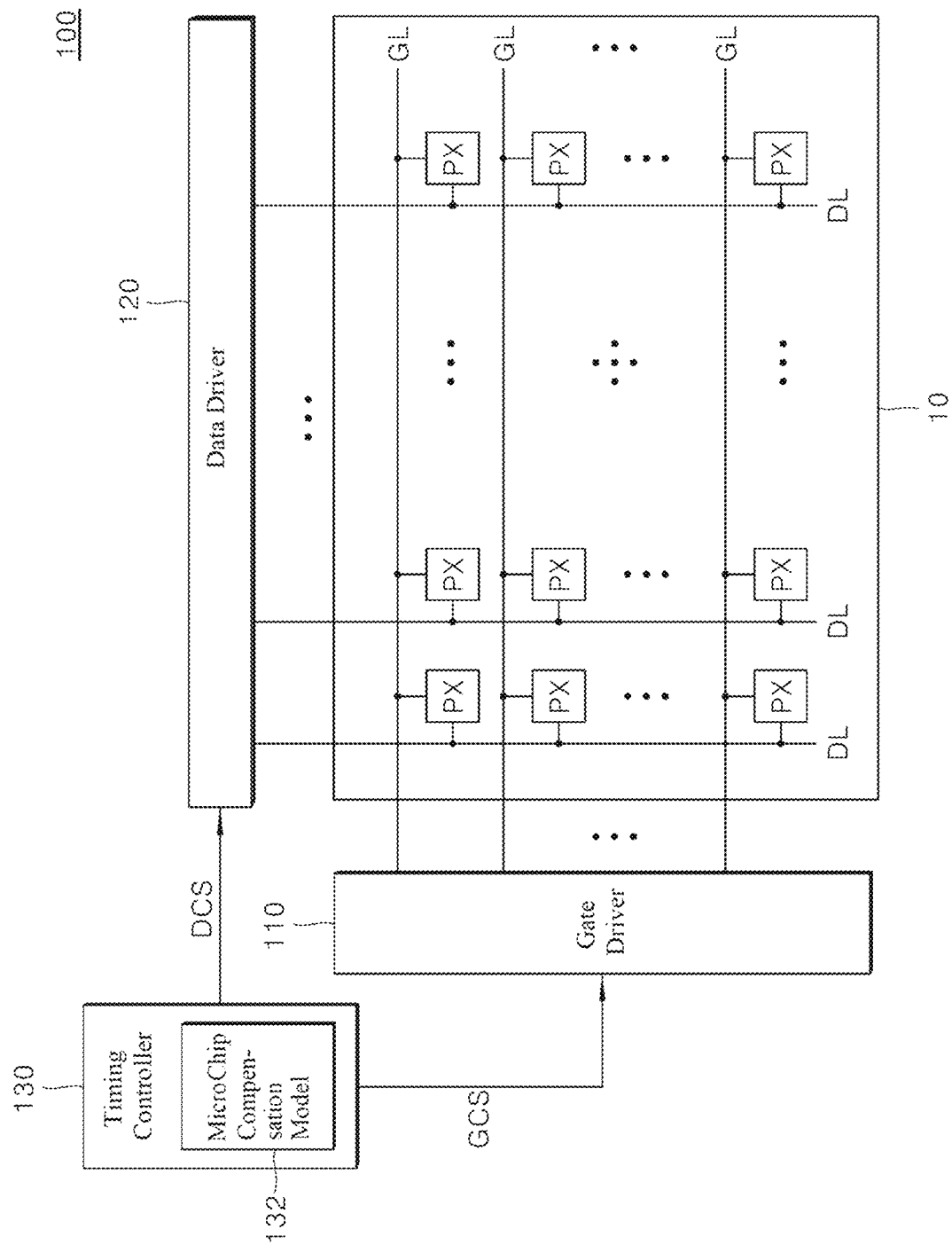
FIG. 1 is a configuration diagram schematically showing an overall configuration of a display device according to an embodiment of the present disclosure.

The above-described purposes, features, and advantages will be described later in detail with reference to the accompanying drawings, and accordingly, a person of ordinary skill in the art to which the present disclosure belongs will be able to easily implement the technical idea of the present disclosure. In describing the present disclosure, when it is determined that a detailed description of the known element related to the present disclosure may unnecessarily obscure the gist of the present disclosure, the detailed description thereof will be omitted. Hereinafter, a preferred embodiment according to the present disclosure will be described in detail with reference to the accompanying drawings. In the drawings, the same reference numerals are used to indicate the same or similar components.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device according to some embodiments of the present disclosure will be described.

First, a basic concept of the present disclosure is as follows.

According to the present disclosure, a simulator is configured to generates a TFT data voltage that decreases based on a time, temperature, and pixel average brightness and an initial data voltage of the TFT before the burn-in phenomenon occurs. When the temperature and video image are input to the simulator, the simulator outputs the driving voltage of the TFT that changes according to image features and playback time of the image and temperature on a pixel basis. The simulator learns the generated data using the deep-learning model, and the input data for the deep-learning include the time, temperature, average brightness, and reduced TFT driving data voltage, and target data is TFT data voltage at an initial stage of the driving. In addition, an algorithm is provided which learns the input data using the deep-learning model to estimate the target data using the input data and compensates for a difference between the reduced TFT driving data and the TFT data voltage at the initial driving stage.

In this regard, the performance of the deep-learning model increases as the amount of training data increases. Thus, the training data generated in the simulator may be augmented using a bootstrap scheme, or a DA-MGD (Data Augmentation-Multivariate-Gaussian Distribution) scheme to additionally generate new data.

Thus, the present disclosure provides a method to solve the burn-in phenomenon of OLED at low cost by generating the data easily as the property of the TFT element is finally changed, and by training the deep-learning model.

Further, in order to identify the performance of the provided method, the inventors of the present disclosure have evaluated the performance of the deep-learning model based on a measuring result of a difference between the compensated data voltage and the initial data voltage on a frame basis. Thus, we have identified that the burn-in was removed and a superior quality is achieved and thus the method has excellent performance. In this regard, the deep-learning model may be implemented as a compensation model in following embodiments.

FIG. 1 is a configuration diagram schematically showing an overall configuration of a display device according to an embodiment of the present disclosure.

Referring to FIG. 1, a display device 100 according to the present disclosure includes a display panel 10 in which a plurality of pixels are defined, and a gate driver 110, a data driver 120, and a timing controller 130 connected to the display panel 10.

In the display panel 10, a plurality of gate lines GL and a plurality of data lines DL are arranged to intersect each other, and each pixel PX is defined at an intersection.

That is, in the display panel 10, the plurality of gate lines GL and the data lines DL are formed on an organic substrate or a plastic substrate so as to intersect each other. Each of red R, green G, and blue B pixels PX is defined at each of intersections of the gate lines GL and data lines DL.

Each of the lines GL and DL of the display panel 10 is connected to the gate driver 110 and the data driver 120 formed out of the display panel 10. Further, although not shown, a power voltage supply line extending in a direction parallel to the data line DL is further formed in the display panel 10 so as to be connected to each pixel PX.

Further, although not shown, each of the pixels PX includes at least one organic electroluminescent (or light-emitting) diode, a capacitor, a switching thin-film transistor and a driving thin-film transistor. In this regard, the organic light-emitting diode may be composed of a first electrode (hole injection electrode), an organic compound layer and a second electrode (electron injection electrode).

The organic compound layer may further include a light-emitting layer in which light is actually emitted, and various organic layers for efficiently transferring carriers of holes or electrons to the light-emitting layer. These organic layers may include a hole injection layer and a hole transport layer positioned between the first electrode and the light-emitting layer, and an electron injection layer and an electron transport layer positioned between the second electrode and the light-emitting layer.

Further, the switching and driving thin-film transistors are connected to the gate line GL and a control signal supply line CL and the data line DL, and the switching thin-film transistors are turned on according to a gate voltage input to the gate line GL, such that data voltage input to the data line DL is transferred to the driving thin-film transistor. The capacitor is connected to and disposed between the thin-film transistor and the power supply line, is charged with the data voltage transmitted from the thin-film transistor, and the charged state thereof is maintained for one frame.

The driving thin-film transistor is connected to the power supply line VL and the capacitor, and supplies a drain current corresponding to the gate-source voltage to the organic light-emitting diode. Accordingly, the organic light-emitting diode emits light in response to the drain current. In this regard, the driving thin-film transistor includes a gate electrode, a source electrode and a drain electrode, and the anode electrode of the organic light-emitting diode is connected to one electrode of the driving thin-film transistor.

The gate driver 110 applies a scan signal to the plurality of gate lines GL. That is, the gate driver 110 sequentially applies the gate voltage to the pixels PX on one horizontal line basis in response to a gate control signal GCS. The gate driver 110 may be implemented as a shift register having a plurality of stages sequentially outputting a high-level gate voltage every one horizontal period.

The data driver 120 applies a data signal to the plurality of data lines DL. That is, the data driver 120 receives an image signal of a digital waveform applied from the timing controller 130 and converts the image signal into a data voltage in a form of an analog voltage having a gradation value that the pixel PX may process. The data driver 120 supplies the data voltage to each pixel PX through the data line DL in response to the input data control signal DCS.

In this regard, the data driver 120 converts the image signal into the data voltage using a plurality of reference voltages supplied from a reference voltage supply unit (not shown).

The timing controller 130 controls the gate driver 110 and the data driver 120. That is, the timing controller 140 receives the image signal, and a timing signal such as a clock signal, a vertical and horizontal synchronization signal as externally applied, and generates the gate control signal GCS and the data control signal DCS, based on the received signals.

In this regard, the horizontal sync signal represents a time it takes to display one line of a screen, and the vertical sync signal represents a time it takes to display a screen of one frame. Further, the clock signal refers to a reference signal used for generating a control signal of each of each of the gate driver and the data driver.

In another example, although not shown, the timing controller 130 is connected to an external system through a predetermined interface so as to receive an image related signal and a timing signal output therefrom at high speed without noise. The interface may include an LVDS (Low Voltage Differential Signal) scheme or a TTL (Thin-film-Thin-film Logic interface) scheme.

In particular, the timing controller 130 according to an embodiment of the present disclosure has a built-in micro-chip 132 equipped with a compensation model that generates a compensation value related to the data voltage based on current deviation of each pixel, and provides the compensation value to the data driver 120. The voltage compensation value is applied to the image signal provided to the data driver. Thus, the voltage compensation value is applied to the data voltage supplied from the data driver 120.

The timing controller 130 includes the micro-chip 132 equipped with the compensation model generated by learning the temperature, weighted time, average brightness, applied data signal, and initial data signal related to each pixel in a deep learning scheme. In this regard, the data signal means the data voltage.

The micro-chip 132 inputs the data signal to the compensation model to generates a compensated data signal. The timing controller 130 applies the generated compensated data signal to the data driver 120.

In an embodiment of the present disclosure, the timing controller 130 has been exemplified as having the micro-chip 132 into which the compensation model is mounted. However, the present disclosure is not limited thereto, and the compensation model in a form of a program or software may be directly mounted into the timing controller 130.

In this regard, the compensation model is generated by a computer simulator that learns the temperature of each pixel, the weighted time, the average brightness of each pixel, the applied data signal thereto, and the initial data signal in a deep learning scheme.

EMBODIMENTS

Hereinafter, a process in which a computer simulator generates a compensation model will be described with reference to the drawings.

Figure 2:
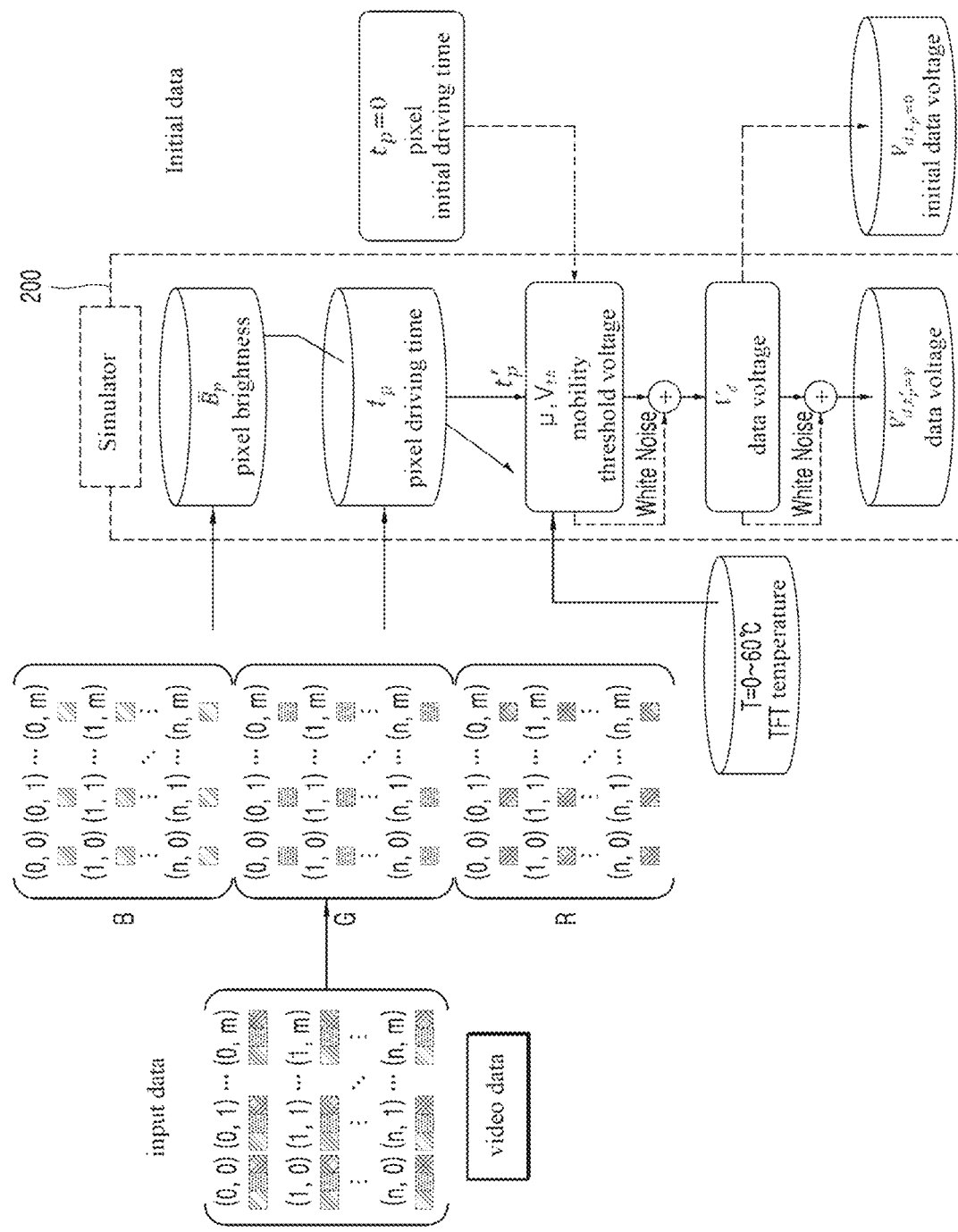
FIG. 2 is a diagram schematically showing a configuration of a simulator for generating a compensation model according to an embodiment of the present disclosure.
Figure 3:
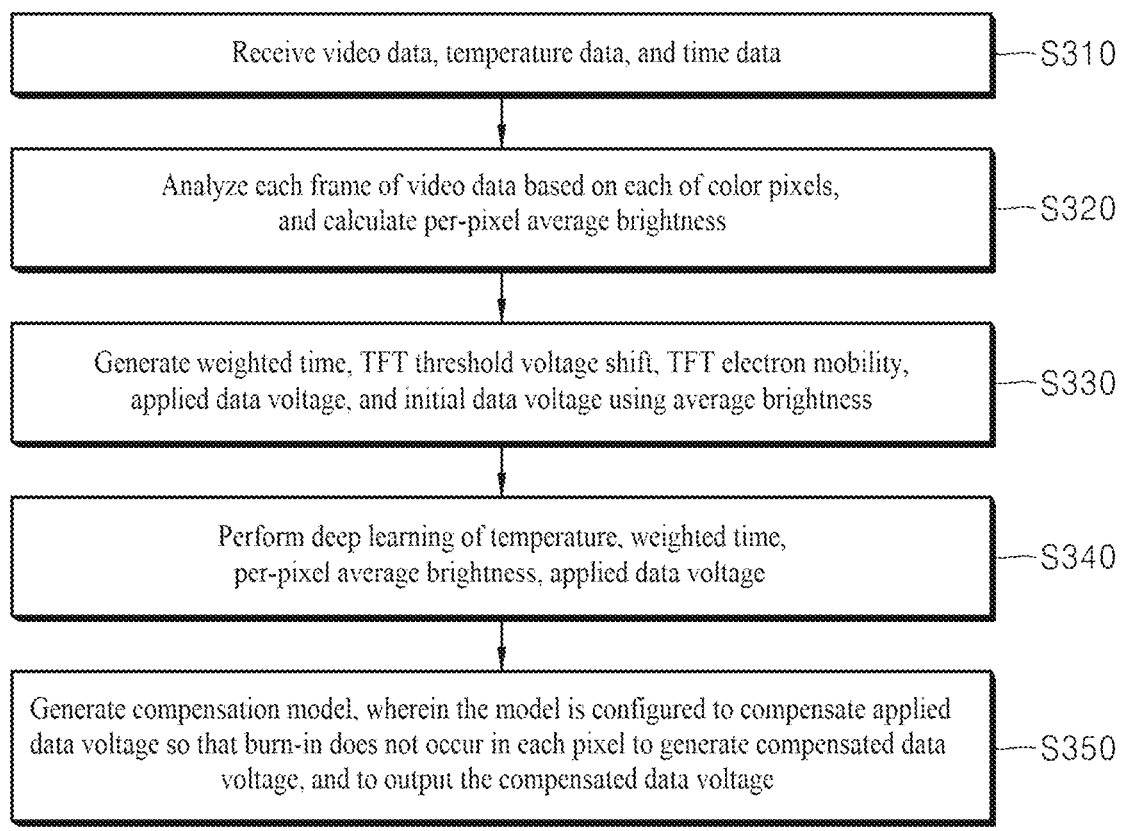
FIG. 3 is an operation flowchart showing a process in which a simulator generates a compensation model according to an embodiment of the present disclosure.

FIG. 2 is a diagram schematically showing a configuration of a simulator for generating a compensation model according to an embodiment of the present disclosure, and FIG. 3 is an operation flow diagram showing a process in which the simulator generates a compensation model according to an embodiment of the present disclosure.

In order to train a deep-learning model for TFT deviation compensation, it is essential to secure burn-in related data. However, it is difficult to acquire TFT-related data because it requires enormous resources to collect the TFT-related data. Instead, a scheme of configuring the simulator with actual TFT-OLED elements and generating data for the deep-learning model using the simulator is proposed. However, since the actual TFT-OLED circuit generates data with a single pixel and a fixed initial value, an actual TFT-OLED panel environment is not reflected properly. Therefore, the simulator that reflects the characteristics of the TFT element driving the actual OLED is configured, and input and output data thereto are generated and used for training the deep-learning model.

Referring to FIG. 2 and FIG. 3, a simulator 200 according to an embodiment of the present disclosure is composed of an input data calculation unit, a threshold voltage and electronic mobility calculation unit, and a data voltage calculation unit. FIG. 2 is a block diagram showing an algorithm of the simulator configured to generate TFT data. In FIG. 2, a TFT temperature, pixel brightness, and pixel driving time denoted as a cylindrical shaped block mean input information to the simulator. Image data used to generate input data for deep-learning employ 30 fram/sec, pixel size 1920×1080, four contents (Documentary, sports, news, movies), and a moving image of a total of 6 hours. In FIG. 2, the data voltage noted as a cylindrical shaped block denotes the target data related to deep-learning.

The simulator 200 according to an embodiment of the present disclosure receives video data, temperature data, and time data in S310 and analyzes each frame of the video data based on each of color pixels such as red R, green G, and blue B pixels, and calculates per-pixel average brightness $\overline{B_p}$ in S320.

The simulator 200 according to an embodiment of the present disclosure calculates the driving time $t_p$ and the average brightness $\overline{B_p}$ of each pixel of the frame of the input image data using an algorithm shown in FIG. 6. FIG. 6 is a diagram showing an example of an algorithm using which the simulator is configured to calculate the driving time and average brightness of each pixel according to an embodiment of the present disclosure. When TFT burn-in data is generated per each actual reproduction time of the input image, the simulator 200 may obtain the same data as the actual one. However, physically, this takes a long time. Thus, the time data is generated using the per-pixel average brightness of the image used as an input to the algorithm.

In this regard, the temperature data may be, for example, in a range of 0 to 60° C., and the time data may be in a range of 0 to 10,000 hours and may be applied on a 100 hours basis.

The simulator 200 according to an embodiment of the present disclosure is an algorithm in a form of a program or software installed in a computer terminal. Further, the simulator 200 may be installed and operate in an electronic device that may execute a program or software in addition to the computer terminal.

The simulator 200 may calculate a corrected driving time $t'_p$ using the average brightness data previously calculated based on the generated time data as a weight on a pixel basis.

Then, the simulator 200 generates a weighted time $t'_p$, threshold voltage shift $\Delta V_{shift}$ and electron mobility μ of the thin-film transistor (TFT) of each pixel, applied data voltage, and initial data voltage using the average brightness calculated on each pixel basis in S330.

That is, the simulator 200 calculates the weighted time $t'_p$ as the corrected driving time, using the average brightness calculated on each pixel basis, and uses the weighted time and the temperature value to calculate the threshold voltage shift $\Delta V_{shift}$ of the thin-film transistor (TFT) of each pixel, and thus-varying threshold voltage $V_{th}$ and the electron mobility thereof.

Then, the simulator 200 calculates electron mobility P of the thin-film transistor (TFT) of each pixel using the calculated threshold voltage shift, and calculates the applied data signal and the initial data signal using the threshold voltage shift and the electron mobility. In this regard, the simulator 200 sets the initial data signal as the target data voltage for training the deep-learning model.

Data is essential to train the deep-learning algorithm. However, since it requires enormous resources to collect and acquire the data in the display industry, the simulator is elaborately configured, and the data that may train the deep-learning model is generated using the simulator.

That is, when TFT burn-in data is generated per each actual reproduction time of the input image, the simulator 200 may obtain the same data as the actual one. However, physically, this takes a long time. Thus, the time data is generated using the per-pixel average brightness of the image used as an input to the algorithm. The simulator 200 may calculate the weighted time $t'_p$ as the corrected driving time calculated using the average brightness data previously calculated based on the generated time data as a weight on a pixel basis as follows.

The simulator 200 calculates the weighted time using the per-pixel average brightness. The simulator 200 calculates the weighted time $t'_p$ using the per-pixel driving time $t_p$, a weight ω applied to the per-pixel time data, and the per-pixel average brightness $\overline{B_p}$ based on a following Equation 1:

$$t'_p \triangleq t_p(1+\omega \overline{B_p}) \quad \text{[Equation 1]}$$

In the above Equation 1, $t'_p$ denotes the weighted time, $t_p$ denotes the per-pixel driving time, $\overline{B_p}$ denotes the per-pixel average brightness, and ω denotes the weight.

The average luminance of the pixels are different from each other when the image is reproduced for a long time. Thus, the weight based on the difference is applied to the per-pixel driving time data.

Further, the simulator 200 calculates the threshold voltage shift $\Delta V_{shift}$ of the thin-film transistor (TFT) of each pixel using the weighted time $t'_p$ as the corrected driving time as calculated above, and the temperature based on a following Equation 2. Then, the simulator 200 calculates thus-varying threshold voltage $V_{th}$ and the electron mobility 1' thereof, using the threshold voltage shift $\Delta V_{shift}$ based on following Equation 3 and Equation 4, respectively.

$$\Delta V_{shift} \triangleq t'^{a_1}_p \quad \text{[Equation 2]}$$

In the above Equation 2, $\Delta V_{shift}$ denotes the threshold voltage shift, $t'_p$ denotes the corrected driving time as the weighted time, and $\alpha_1$ denotes a threshold voltage shift reduction coefficient.

Further, the simulator 200 finally calculates the threshold voltage $V_{th}$ and the electron mobility μ using the threshold voltage shift $\Delta V_{shift}$, according to the following Equations 3 and 4, respectively.

$$V_{th} \triangleq e^{\alpha_2(T-T_{limit})} + |\Delta V_{shift}| + \varepsilon_1$$

In the above Equation 3, $V_{th}$ denotes the threshold voltage, $\alpha_2$ denotes the threshold voltage reduction coefficient, T denotes the temperature, $T_{limit}$ denotes a maximum temperature to guarantee the TFT performance, and $\varepsilon_1$ denotes a threshold voltage noise.

$$\mu \triangleq e^{-\alpha_3 T} + \varepsilon_2 \quad \text{[Equation 4]}$$

In the above Equation 4, μ denotes the electron mobility, $\alpha_3$ denotes an electron mobility reduction coefficient, T denotes the temperature, and $\varepsilon_2$ denotes an electron mobility noise.

In this regard, considering noise added to a display circuit using an electronic circuit, white noises are generated as in following Equation 5 and Equation 6, respectively and are added thereto.

$$\varepsilon_1 \sim N\left(0, \frac{\max(V_{th}) + \min(V_{th})/2}{100}\right) \quad \text{[Equation 5]}$$

$$\varepsilon_2 \sim N\left(0, \frac{\max(\mu) + \min(\mu)/2}{100}\right) \quad \text{[Equation 6]}$$

Finally, the simulator 200 calculates the data voltage $V_{d, t_p=\gamma}$ that the TFT applies to the OLED, based on the threshold voltage $V_{th}$ calculated in the Equation 3 and the electron mobility μ calculated in the Equation 4.

In this regard, the simulator 200 calculates the applied data voltage $V'_{d, t_g=\gamma}$ in consideration of the noise, based on a following Equation 7. That is, the simulator 200 calculates the data voltage Vd that the TFT applies to the OLED using the threshold voltage $V_{th}$ and electron mobility as previously calculated as follows, and adds the white noise thereto to generate the data voltage in consideration of the noise and thus to generate the applied data voltage $V'_d$.

$$V'_{d,t_p=\gamma} \triangleq V_{DD} - \sqrt{\left(\frac{100}{100-\alpha}\right)\left(\frac{n}{1}\right)\frac{2I'_{max}}{\mu}C_{ox}\left(\frac{W}{L}\right)} - |V'_{th,t_p=\gamma}| + \epsilon \quad \text{[Equation 7]}$$

In the above Equation 7, $V'_{d, t_p=\gamma}$ denotes the applied data signal (voltage), $V_{DD}$ denotes a drain voltage of the thin-film transistor (TFT), a represents a data voltage reduction coefficient, n represents a gray level of the thin-film transistor (TFT), l represents a gray level range of the thin-film transistor (TFT), $I'_{MAX}$ represents a maximum input current of the thin-film transistor (TFT) in consideration of the noise, μ represents the electron mobility, $C_{ox}$ denotes a capacitance per unit area of the thin-film transistor (TFT), L denotes a channel length of the thin-film transistor (TFT), W denotes a channel width of the thin-film transistor (TFT), and F denotes the data voltage noise.

Further, the simulator 200 calculates an initial TFT data voltage according to a following Equation 8, and uses this initial data voltage as the target data in training the deep-learning algorithm.

$$V_{d,t_p=0} = V_{DD} - \sqrt{\left(\frac{100}{100-\alpha}\right)\left(\frac{n}{l}\right)\frac{2I_{max}}{\mu_0}C_{ox}\left(\frac{W}{L}\right)} - |V_{th,t_p=0}|$$ [Equation 8]

In the above Equation 8, $V_{d, t_p=0}$ denotes the initial data signal (voltage), $V_{DD}$ denotes the drain voltage of the thin-film transistor (TFT), α denotes the data voltage reduction coefficient, n denotes the gray level of the thin-film transistor (TFT), l represents the gray level range of the thin-film transistor (TFT), $I_{MAX}$ represents the maximum input current of the thin-film transistor (TFT), μ represents the electron mobility, $C_{ox}$ denotes the capacitance per unit area of the thin-film transistor (TFT), L denotes the channel length of the thin-film transistor (TFT), and W denotes the channel width of the thin-film transistor (TFT).

Finally, when the simulator 200 uses the input image to generate the data used as the input to the deep-learning model, the simulator 200 generates a total of following 5 feature data as the input data to the deep-learning model: the per-pixel average brightness $\overline{B_p}$, the temperature T, the per-pixel driving time $t'_p$, per-pixel degraded data voltage $V'_{d,t_p=\gamma}$, and the initial data voltage $V_{d, t_p=\gamma}$.

Parameters and symbols used in the embodiment of the present disclosure are indicated in Table 1 below.

TABLE 1

| Parameter | Symbol | Parameter | Symbol | Parameter | Symbol |
|---|---|---|---|---|---|
| Input image data | $F_N$ | Pixel | p | Total number of frames of input image | N |
| Per-pixel driving time | $t_p$ | Per-pixel brightness | $B_p$ | Per-pixel average brightness | $\overline{B_p}$ |
| Weight | ω | Time to be generated using simulator | t | Weighted driving time | $t'_p$ |
| Threshold voltage shift | $\Delta V_{shift}$ | Temperature | T | Voltage shift reduction coefficient | $\alpha_1$ |
| Threshold voltage reduction coefficient | $\alpha_2$ | Electron mobility reduction coefficient | $\alpha_3$ | Maximum temperature to guarantee TFT performance | $T_{limit}$ |
| Threshold voltage noise | $\varepsilon_1$ | Electron mobility noise | $\varepsilon_2$ | TFT driving voltage | $V_{DD}$ |
| Initial TFT data voltage | $V_{d, t_p=0}$ | Channel length of TFT | W | Initial TFT threshold voltage | $V_{th, t_p=0}$ |
| Threshold voltage of TFT in consideration of noise | $V'_{th}$ | Gray level pixel | α | Entire gray level range | l |
| Data voltage of TFT in consideration of noise | $V'_d$ | Channel length of TFT | L | Maximum input current of TFT | $I_{MAX}$ |
| Capacitance per unit area of TFT | $C_{ox}$ | Initial TFT electron mobility | $\mu_o$ | Total number of pixels | P |

The simulator 200 according to the present disclosure generates approximately 50 billion pixel data on a 100 hours basis at a temperature of 0 to 60° C. and in a range of 0 to 10,000 hours. Then, the simulator 200 generates total five data related to each pixel data: temperature, weighted time, average brightness, applied data voltage (reduced data voltage), and initial data voltage in the same process as described above.

After the simulator 200 has generated the five data related to each pixel in the same process as described above, the simulator 200 executes learning of the five data in the deep learning manner.

Because each OLED element operates independently, the simulator 200 trains the model on a pixel basis so that the correlation between the pixels is not learned. The simulator 200 generates approximately 50 billion pixel data per each of R, G, and B pixels which in turn are used as data to train the deep-learning model.

[Amplification of TFT Data of Each Pixel]

In general, the deep-learning model has better performance as an amount of data increases. Therefore, a data augmentation method may additionally generate data using the data generated in the simulator 200. The deep-learning model may learn the additionally generated data to increase the performance.

Figure 7:
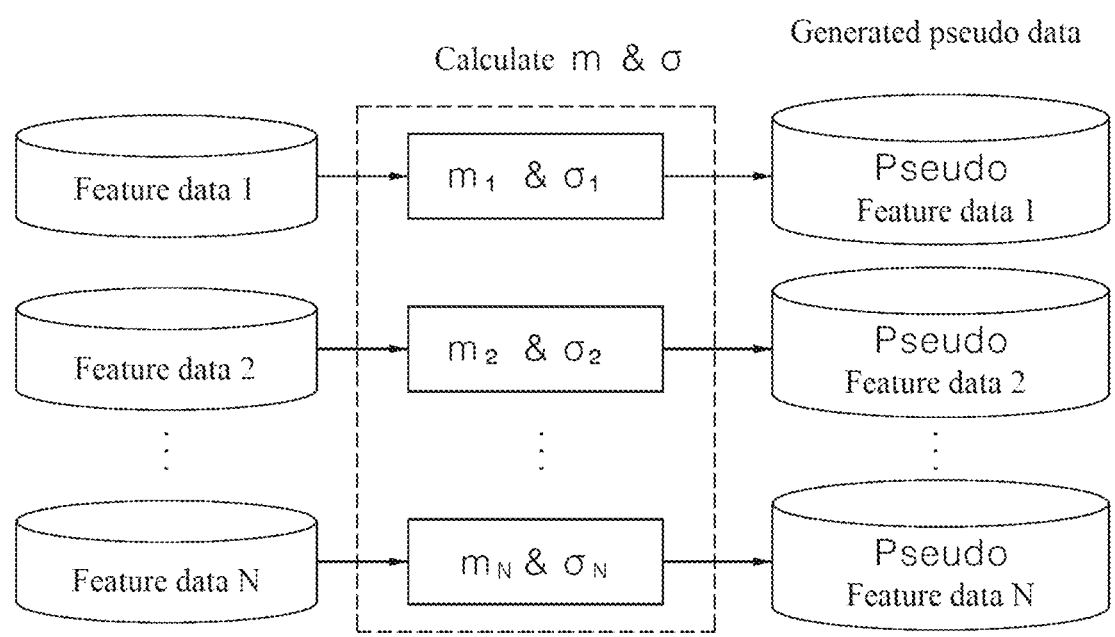
FIG. 7 is a diagram showing an example of augmenting data used for deep-learning learning in a bootstrap scheme according to an embodiment of the present disclosure.

In an embodiment of the present disclosure, data was augmented using each of two data augmentation methods and was additionally learned by the deep-learning model. Thus, performance of each of the data augmentation methods was evaluated In a first data augmentation method, data may be augmented in a bootstrap scheme as shown in FIG. 7. This method calculates an average and a standard deviation of each feature of the data, constructs a distribution map related to each feature, and then newly generates data such that the newly generated data complies with the distribution map. FIG. 7 is a diagram showing an example of augmenting data used for deep-learning in a bootstrap scheme according to an embodiment of the present disclosure.

Since the bootstrap scheme augments data independently on each feature basis, the bootstrap scheme may be used when the features of the data to be generated need to be generated in an independent relationship.

Figure 8:
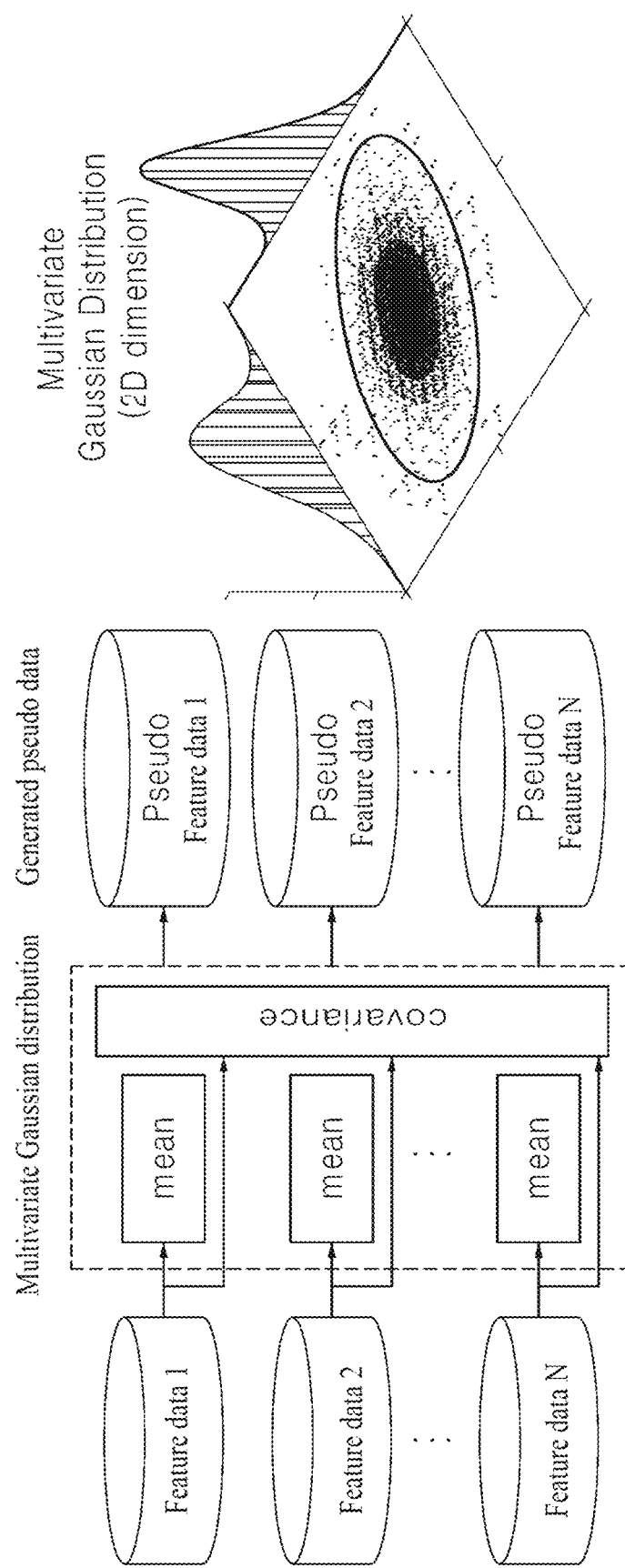
FIG. 8 is a diagram showing an example of augmenting data used for deep-learning learning in a DAMGD scheme according to an embodiment of the present disclosure.

In a second method, data may be augmented using a multivariate Gaussian distribution (MGD) scheme as shown in FIG. 8. FIG. 8 is a diagram showing an example of augmenting data used for deep-learning in a DAMGD scheme according to an embodiment of the present disclosure. In particular, in the multivariate Gaussian distribution scheme, the data may be augmented using DA-MGD. DA-MGD calculates an average and a standard deviation of each feature, and then constructs the MGD with the averages and standard deviations of the features. In this regard, the MGD is an n-dimensional Gaussian distribution, and a right portion of FIG. 8 is a visualization of a two-dimensional MGD. DA-MGD calculates the relationship between features as covariance by means of the average and standard deviation of each feature, applies a weight to each feature based on the relationship, and constructs an n-dimensional Gaussian distribution, and newly generates data so that the newly generated data complies with the distribution. DA-MGD generates data via a distribution map based on the relationship between the features. Therefore, it is effective to use DA-MGD when the features of the generated data should have a dependent relationship in augmenting the data. In an embodiment of the present disclosure, the compensation model was generated using both methods.

[Training and Generating a Deep-Learning Model Using TFT Data]

As described above, the deep-learning-based learning model has better performance as an amount of data increases. In an embodiment of the present disclosure, the data augmentation method additionally generated data using the data generated in the simulator. Then, the newly generated data was additionally learned by the deep-learning model, such that the performance of the model was increased. Each of the two data augmentation methods was used to augment the data. The augmented data was additionally learned by the deep-learning model. Thus, the performance of the data augmentation method was evaluated.

Figure 4:
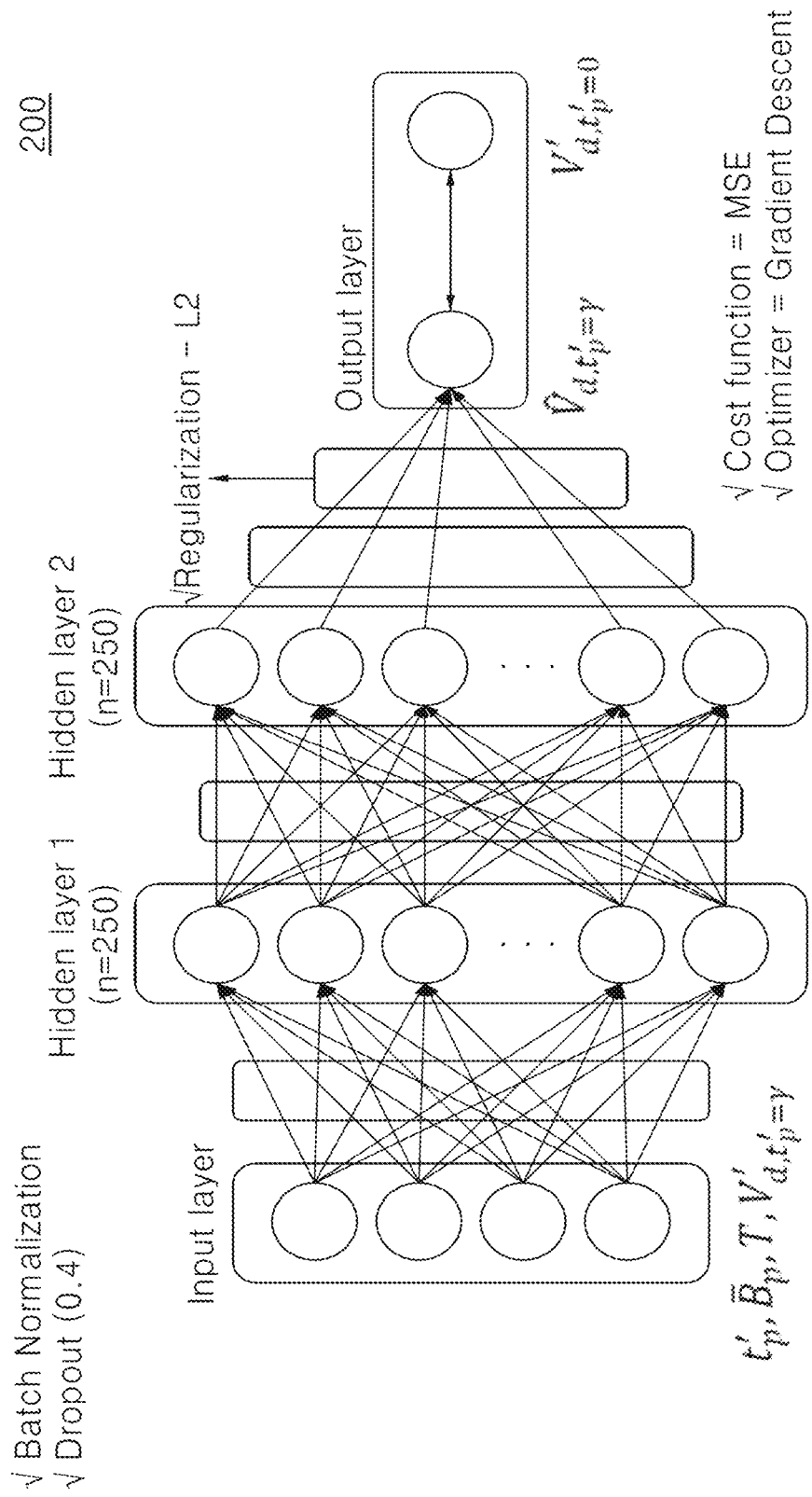
FIG. 4 is a diagram showing a deep-learning model structure using which a simulator learns TFT data of each pixel in a deep-learning manner according to an embodiment of the present disclosure.

The simulator 200 according to the present disclosure performs deep learning (as shown in FIG. 4) of the five data such as the temperature, weighted time, average brightness, applied data voltage (reduced data voltage), and initial data voltage related to each pixel generated in the same process as described above in S340. FIG. 4 is a diagram showing a deep-learning model structure using which a simulator learns TFT data of each pixel in a deep-learning manner according to an embodiment of the present disclosure. As shown in FIG. 4, the deep-learning model is composed of an input layer, a first hidden layer Hidden layer 1, a second hidden layer Hidden layer 2, and an output layer. In FIG. 4, the deep-learning model performs batch normalization and dropout between the input layer and the first hidden layer, and performs regularization between the second hidden layer and the output layer. The deep-learning model may use a multi-layer perceptron-based DNN. Among the generated data, four features $\overline{B_p}$, $t'_p$, and $V'_{d,\,t_p=\gamma}$ are used as input data, and one feature $V_{d,\,t_p=0}$ is used as the target data to train the deep-learning model. The model may be constructed using a batch size of 100,000, two hidden layers, the epoch of 5, the cost function as the mean square error (MSE), and the activation function as the rectified linear unit (ReLU). Since the deep-learning model shown in FIG. 4 is widely used in the same technical field, a detailed description thereof will be omitted.

The input data for deep-learning is composed of a total of 4 features such as the temperature T, the average brightness $\overline{B_p}$, the weighted time $t'_p$ as the corrected driving time, and the applied data voltage $V'_{d,\,t_p=\gamma}$ related to each of R, G, and B pixels. One target data $V_{d,t_p=0}(T,\overline{B_p},0)$ is set as one pair of training data. The input data includes a total of 50 billion training data. As shown in FIG. 4, the simulator trains the model so that the corrected data voltage $\hat{V}_{d,t'_p=\gamma}$ as the output of the deep-learning model is closer to the target data.

Since the data used for training the deep-learning model is generated via the simulator 200, a feature dimension is not high. Thus, the data is used for training the model, a problem of overfitting may occur. Solving the overfitting problem is a very important factor because product when the training of the model is completed, and then the model is loaded into the actual product, and data that is not used for training is input to the model, the performance of the model is low. The cost function employed the mean squared error function, and a gradient descent is used as the optimizer.

In an embodiment of the present disclosure, optimization was performed via batch normalization, dropout, and regularization.

That is, when, in training the model, the simulator 200 learns the weighted time, average brightness per pixel, temperature and applied data voltage in the deep learning manner, the data passes through each layer, and is subjected to affine and nonlinearity such that the distribution of the data input later changes and the training speed may decrease. Thus, the learning is performed while controlling the distribution of the input data to each layer via the batch normalization. The learning is performed in a dropout scheme that does not use a node between the layers arbitrarily in training the model. The learning is performed while controlling the complexity by reducing parameter values via the regularization. Therefore, the simulator 200 according to the present disclosure was able to prevent the above-mentioned overfitting problem to achieve the optimization.

Figure 5:
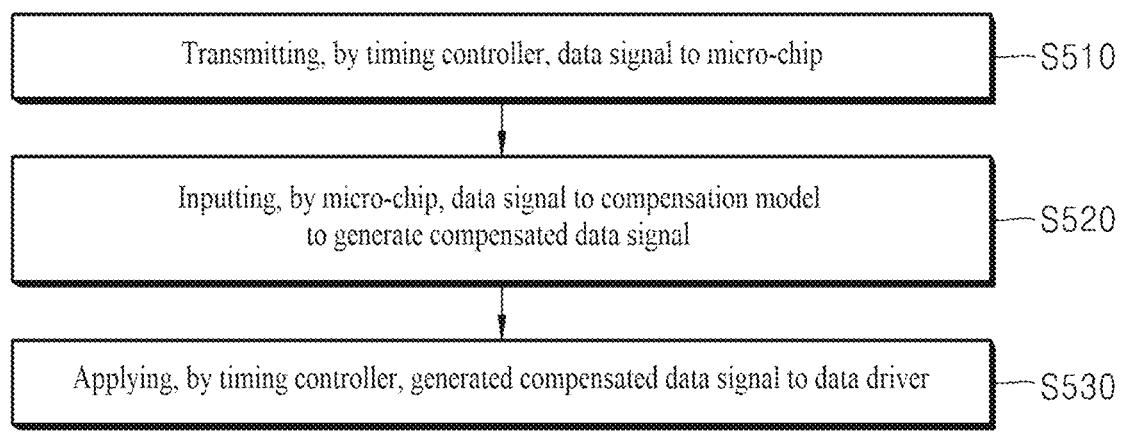
FIG. 5 is a diagram showing an operation flowchart for illustrating a data signal compensation method in a display device according to an embodiment of the present disclosure.

FIG. 5 is a diagram showing an operation flowchart for illustrating a data signal compensation method in a display device according to an embodiment of the present disclosure.

Referring to FIG. 5, in the display device 100 according to an embodiment of the present disclosure, the timing controller 130 includes the micro-chip 132 equipped with the compensation model generated by performing deep learning of the temperature, weighted time as the corrected driving time, the average brightness, the applied data signal, and the initial data signal related to each pixel.

The timing controller 130 transmits the data signal to the microchip 132 in S510 before applying the data signal to the data driver 120.

Then, the micro-chip 132 may input the data signal to the compensation model to generate the compensated data signal in S520.

In this regard, the compensation model installed inside the micro-chip 132 is generated by the simulator 200 learning the temperature, the weighted time, the average brightness, the applied data signal, and the initial data signal related to each pixel in the deep learning scheme as described above. Accordingly, the micro-chip 132 generates the compensated data signal such that the burn-in phenomenon does not occur, using the compensation model trained as described above.

Then, the timing controller 130 applies the generated compensated data signal to the data driver 120 in S530.

Accordingly, the data driver 120 supplies the compensated data signal to each pixel, so that the burn-in phenomenon does not occur in each pixel.

In another example, in an embodiment of the present disclosure, the training data is generated via the simulator 200. That is, one training data was composed of the five feature data such as the temperature T, the average brightness $\overline{B}_p$, the weighted time $t'_p$ as the corrected driving time, the applied data voltage $V'_{d,t_p=\gamma}$, and the target data $V_{d,t_p=0}$. About 50 billion training data were used per each of the R, G, and B pixels. 99% (49.5 billion data) thereof were used for training the model, and 1% (500 million) thereof were used as test data.

Finally, in order to select data suitable for training the model, the performance of the data generated via the simulator 200 and the data augmentation process is evaluated.

In order to evaluate the performance of the compensation model generated in the simulator 200 as described above, the inventors of the present disclosure converted a difference between the data voltage estimated using the deep-learning-based compensation model and the initial data voltage of the TFT set as the target data into a percentage and calculated the percentage on each pixel basis. Then, according to a following Equation 9, an average value of data voltages estimated per a frame of each pixel of the test data was used as an accuracy. The Equation 9 is used to calculate the accuracy of the compensation model.

$$\text{Accuracy} = 100 \frac{1}{N} \frac{1}{P} \sum_{F_N=1}^{N} \sum_{p=1}^{P} \frac{\hat{V}_{d,t_p=\gamma}}{V_{d,t_p=0}} (\%) \quad \text{[Equation 9]}$$

In the Equation 9, Accuracy represents the accuracy (precision), N represents the total number of frames in the input image, P represents the total number of pixels, $F_N$ represents the input image data, $V_{d, t_p=0}$ represents the initial data signal (voltage), and $\hat{V}_{d,t_p=\gamma}$ represents the output data signal (voltage).

Further, in an embodiment of the present disclosure, when the data generated using each of the aforementioned two data augmentation methods (bootstrap and DAMGD) were mixed with the data generated in the simulator 200, and the mixture was used to train the deep-learning model, the data voltage estimation accuracy was obtained as shown in a following Table 2.

TABLE 2

| Scheme | Simulator | Simulator + bootstrap | Simulator + DAMGD |
|---|---|---|---|
| Accuracy | 99.27 | 99.85 | 99.97 |

That is, as seen in the above Table 2, it was identified that the performance increased when the deep-learning model was trained together using the data augmentation method than when the deep-learning model is trained using only the data generated by the simulator 200. Further, the inventors of the present disclosure identified that when the deep-learning model was trained using the data generated using the DAMGD scheme that reflects the relational characteristics of the features rather than the bootstrap scheme in which the correlation between the features is not considered, the performance was excellent. This is because the factors of TFT are correlated with each other. Therefore, in an embodiment of the present disclosure, the simulator additionally generates the data using the DAMGD data augmentation method, and the deep-learning model was trained using the additionally generated data and was finally constructed. In order to identify the performance of the deep-learning model, the burn-in image and the corrected image were respectively output based on the reduced TFT data voltage used for training the model, and the corrected data voltage output from the model.

Figure 9:
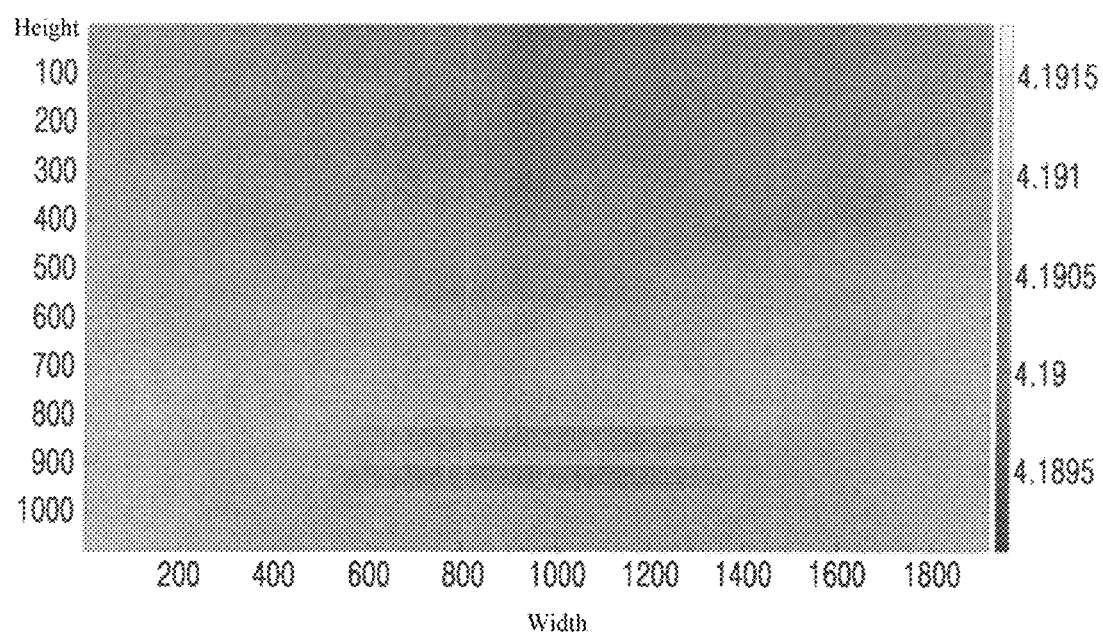
FIG. 9 is a diagram showing a result of outputting, as an image, each of reduced data voltage of a TFT and compensated data voltage obtained using a deep-learning model according to an embodiment of the present disclosure.

FIG. 9 is a diagram showing the result of outputting each of the reduced data voltage of the TFT and the data voltage compensated via the deep-learning model as an image according to an embodiment of the present disclosure.

As shown in FIG. 9, regarding the reduced data voltage (a), the distribution of the reduced data voltage had a range of 4.18 to 4.19, and the strong burn-in occurred at a subtitle, depending on the characteristics of the input image (movie).

However, when the reduced data voltage (a) was corrected through the deep-learning model, the compensated data voltage (b) was output.

As a result, it was identified that regarding the compensated data voltage (b), the average voltage increased compared to the reduced voltage (a) before the compensation. The compensated data voltage increased to 4.447 which was the initial data voltage set as the target data. The deviation decreased. it was identified that the data voltage is compensated through the trained deep-learning model.

FIG. 10 is a diagram showing an image of an OLED luminance value reflected on a white screen, wherein each of reduced data voltage and corrected data voltage is converted into the OLED luminance value, according to an embodiment of the present disclosure.

As shown in FIG. 10, it was identified that the reduced data voltage distributed in a bottom center of FIG. 9 resulted in the burn-in phenomenon in (a) in FIG. 10, whereas the overall brightness was improved as shown in (b) in FIG. 10, and an irregular image at the bottom center was reduced.

In an embodiment of the present disclosure, the inventors used four types of image data used to input to the simulator 200 to construct the deep-learning model, per each content type, and all data were used to train the model regardless of the content type. In addition, in an actual OLED panel, the characteristics of the R, G, and B pixels are different from each other. Thus, the model independently learns the data of the R, G, and B pixels.

Further, performance evaluation was carried out using the reduced data of the four image data used as the input image to the simulator 200 as the test data in the model trained based on each of the R, G, and B pixels of the image. The performance evaluation results are shown in Table 3 below. That is, when the four burn-in images used as the input images are input to the model trained based on each of the R, G, and B pixels of the image, a difference (accuracy) between the initial TFT data voltage and the estimated voltage is measured.

TABLE 3

| | Accuracy (%) | | | |
| --- | --- | --- | --- | --- |
| Model | Test set 1 (Document) | Test set 2 (Sports) | Test set 3 (Movie) | Test set 4 (News) |
| R | 99.26 | 99.17 | 99.20 | 99.21 |
| G | 99.28 | 99.22 | 99.23 | 99.14 |
| B | 99.30 | 99.22 | 99.17 | 99.29 |

As seen from Table 3 above, it was identified that the compensation model according to an embodiment of the present disclosure exhibited high performance related to the input image regardless of the content type and the RGB values. I was identified that the algorithm according to an embodiment of the present disclosure exhibited high accuracy regardless of the content type and the compensation model for each of the R, G, and B pixels. In general, when augmenting the data, actual data is augmented and the augmented data is used. However, it was additionally identified that good performance was obtained even when virtual data generated via the simulator 200 was augmented and the augmented data was used.

Thus, in accordance with the present disclosure, the display device may compensate for deviation in an OLED display at low cost.

Further, according to the present disclosure, a compensation circuit that may maintain display performance regardless of element and circuit variations as long as the video data and collected data related to TFT of each pixel are available may be implemented.

Further, according to the present disclosure, the display device has the micro-chip equipped with the compensation model. A viewer may view the image on displays of various sizes, such as smartphones and small displays, in addition to TV.

Further, the deep-learning-based software method according to the present disclosure may be applied to the display device. Thus, a very simple and low-cost scheme compared to a conventional scheme using an external compensation circuit may be achieved. Thus, the burn-in phenomenon of the OLED panel may be removed with a simple circuit and chip.

As described above, according to the present disclosure, the display device including the timing controller including the micro-chip equipped with the compensation model generated by learning the temperature, the time, the average brightness, and the data voltage related to each pixel in the deep learning scheme may be realized Further, according to the present disclosure, the method of generating the compensation model for the display device based on deep-learning may be realized in which the video data, the time, and the temperature are input into the computer simulator, and the computer simulator calculates the average brightness value, the weighted time, the TFT threshold voltage shift, the electron mobility, the applied data voltage and the initial data voltage related to each pixel, based on the video data, and the simulator learns these data using a deep learning scheme to generate the compensation model, wherein the model is configured to compensate the applied data voltage to generate a compensated data voltage, and to output the compensated data voltage.

Further, according to the present disclosure, the data signal compensation method in the display device may be realized in which when the data voltage is applied from the timing controller including the micro-chip equipped with the compensation model to the data driver, the compensated data voltage is generated from the compensation model so that the burn-in does not occur in each pixel, and then the compensated data voltage is applied to each pixel through the data driver.

The present disclosure has been described above with reference to the illustrated drawings. However, the present disclosure is not limited to the embodiments and drawings disclosed in the present disclosure. It is obvious that various modifications may be made by a person skilled in the art within the scope of the technical idea of the present disclosure. In addition, although the effect of the configuration of the present disclosure has not been explicitly described above while explaining the embodiment of the present disclosure, it is natural that the predictable effect from the confirmation should also be appreciated.

INDUSTRIAL APPLICABILITY

The present disclosure may be used in the display device to compensate the data voltage so that the burn-in does not occur in the organic light-emitting display (OLED) panel and supply the compensated data voltage.

What is claimed is:

1. A display device comprising:
a display panel including a plurality of gate lines and a plurality of data lines that intersect each other, and a plurality of pixels, each pixel from the plurality of pixels defined at an intersection of a gate line from the plurality of gate lines and a data line from the plurality of data lines;
a gate driver configured to apply a scan signal to the plurality of gate lines;
a data driver configured to apply a data signal to the plurality of data lines; and
a timing controller configured to control the gate driver and the data driver,
wherein the timing controller includes a micro-chip having a compensation model mounted therein, wherein the compensation model is generated by learning a temperature, a weighted time, an average brightness, an applied data signal, and an initial data signal related to each pixel from the plurality of pixels by a deep learning scheme,
wherein the micro-chip is configured to input the data signal to the compensation model to generate a compensated data signal,
wherein the timing controller is configured to apply the generated compensated data signal to the data driver.

2. The display device of claim 1, wherein the compensation model is generated by a simulator learning the temperature, the weighted time, the average brightness, the applied data signal, and the initial data signal related to each pixel from the plurality of pixels by the deep learning scheme.

3. The display device of claim 2, wherein the simulator is configured to:
calculate an average brightness of each pixel from the plurality of pixels;
calculate the weighted time using the calculated average brightness;
calculate a threshold voltage shift of a thin-film transistor (TFT) of each pixel from the plurality of pixels using the weighted time;
calculate an electron mobility of the thin-film transistor (TFT) of each pixel from the plurality of pixels using the calculated threshold voltage shift;

calculating the applied data signal and the initial data signal using the threshold voltage shift and the electron mobility; and set the initial data signal as target data voltage.

4. The display device of claim 3, wherein the simulator is configured to calculate the weighted time $t'_p$ using a per-pixel driving time $t_p$, a weight $\omega$ corresponding to per-pixel time data, and a per-pixel average brightness $\overline{B_p}$.

5. The display device of claim 4, wherein the simulator is configured to calculate the weighted time $t'_p$ according to a following Equation:

$$t'_p \triangleq t_p(1+\omega\overline{B_p})$$

where $t'_p$ denotes the weighted time, $t_p$ denotes the per-pixel driving time, $\overline{B_p}$ denotes the per-pixel average brightness, and $\omega$ denotes the weight.

6. The display device of claim 3, wherein the simulator is configured to calculate the threshold voltage shift $\Delta V_{shift}$ according to a following Equation:

$$\Delta V_{shift} \triangleq t'_p{}^{\alpha_1}$$

where $\Delta V_{shift}$ denotes the threshold voltage shift, $t'_p$ denotes the weighted time, and $\alpha_1$ denotes a threshold voltage shift reduction coefficient.

7. The display device of claim 3, wherein the simulator is configured to calculate the electron mobility $\mu$ according to a following Equation:

$$\mu \triangleq e^{-\alpha_3 T} + \epsilon_2$$

where $\mu$ denotes electron mobility, $\alpha_3$ denotes an electron mobility reduction coefficient, T denotes the temperature, and $\epsilon_2$ denotes an electron mobility noise.

8. The display device of claim 3, wherein the simulator is configured to calculate the applied data signal $V'_{d,\,t_p=\gamma}$ according to a following Equation:

$$V'_{d,t_p=\gamma} \triangleq V_{DD} - \sqrt{\left(\frac{100}{100-\alpha}\right)\left(\frac{n}{l}\right)\frac{2I'_{max}}{\mu}C_{ox}\left(\frac{W}{L}\right)} - |V'_{th,t_p=\gamma}| + \epsilon$$

where $V'_{d,\,t_p=\gamma}$ denotes the applied data signal (voltage), VDD denotes a drain voltage of the thin-film transistor (TFT), $\gamma$ represents a data voltage reduction coefficient, n represents a gray level of the thin-film transistor (TFT), l represents a gray level range of the thin-film transistor (TFT), $I'_{MAX}$ represents a maximum input current of the thin-film transistor, $\mu$ (TFT) in consideration of a noise, $\mu$ represents the electron mobility, $C_{ox}$ denotes a capacitance per unit area of the thin-film transistor (TFT), L denotes a channel length of the thin-film transistor (TFT), W denotes a channel width of the thin-film transistor (TFT), and $\epsilon$ denotes a data voltage noise.

9. The display device of claim 3, wherein the simulator is configured to calculate the initial data signal $V_{d,\,t_p=0}$ according to a following Equation:

$$V_{d,t_p=0} = V_{DD} - \sqrt{\left(\frac{100}{100-\alpha}\right)\left(\frac{n}{l}\right)\frac{2I_{max}}{\mu_0}C_{ox}\left(\frac{W}{L}\right)} - |V_{th,t_p=0}|$$

where $V_{d,\,t_p=0}$ denotes the initial data signal (voltage), $V_{DD}$ denotes a drain voltage of the thin-film transistor (TFT), $\gamma$ represents a data voltage reduction coefficient, n represents a gray level of the thin-film transistor (TFT), l represents a gray level range of the thin-film transistor (TFT), $I_{MAX}$ represents a maximum input current of the thin-film transistor (TFT), $\mu$ represents the electron mobility, $C_{ox}$ denotes a capacitance per unit area of the thin-film transistor (TFT), L denotes a channel length of the thin-film transistor (TFT), and W denotes a channel width of the thin-film transistor (TFT).

10. A method for compensating a data signal in a display device that includes: a display panel in which a plurality of gate lines and a plurality of data lines intersect each other, a plurality of pixels where each pixel is defined at an intersection of a gate line from the plurality of gate lines and a data line from the plurality of data lines; a gate driver configured to apply a scan signal to the plurality of gate lines; a data driver configured to apply a data signal to the plurality of data lines; and a timing controller including a micro-chip having a compensation model mounted therein, wherein the compensation model is generated by learning a temperature, a weighted time, an average brightness, an applied data signal, and an initial data signal related to the each pixel from the plurality of pixels in a deep learning scheme, the method comprising:

transmitting, by the timing controller, the data signal to the micro-chip;

inputting, by the micro-chip, the data signal to the compensation model to generate a compensated data signal; and applying, by the timing controller, the generated compensated data signal to the data driver.

11. A method for generating a compensation model for a display device in a deep-learning manner, the method comprising:

receiving, by a computer simulator, video data, a temperature,. and time data;

analyzing, by the computer simulator, each frame of the video data based on each of a plurality of color pixels, and calculating, by the computer simulator, a per-pixel average brightness;

generating, by the computer simulator, data including a weighted time, a threshold voltage shift of a thin-film transistor (TFT), an electron mobility, an applied data voltage, and an initial data voltage related to each color pixel from the plurality of color pixels, using the per-pixel average brightness;

learning, by the computer simulator, the weighted time, the per-pixel average brightness, the temperature, and the applied data voltage in a deep learning manner; and learning, by the computer simulator, the generated data in the deep learning manner to generate a compensation model, wherein the compensation model is configured to compensate the applied data voltage so that burn-in does not occur in each color pixel from the plurality of color pixels to generate a compensated data voltage, and to output the compensated data voltage.

12. The method of claim 11, wherein applying the generated compensated data signal to the data driver comprises:

calculating, by the computer simulator, the weighted time using the per-pixel average brightness;

calculating, by the computer simulator, the threshold voltage shift of the thin-film transistor (TFT) of each color pixel from the plurality of color pixels using the weighted time;

calculating, by the computer simulator, the electron mobility varying based on the temperature of the thin-film transistor (TFT) of each color pixel from the plurality of color pixels, using the threshold voltage shift; and calculating, by the computer simulator, the applied data voltage and the initial data voltage using the threshold voltage shift and the electron mobility.

13. The method of claim 11, wherein applying the generated compensated data signal to the data driver comprises:
calculating, by the computer simulator, an average and a standard deviation of each feature of the data including the weighted time, the per-pixel average brightness, the temperature and the applied data voltage in a bootstrap scheme;
constructing, by the computer simulator, a distribution map of each feature; and
generating, by the computer simulator, new data so that the newly generated data complies with the distribution map.

14. The method of claim 11, wherein applying the generated compensated data signal to the data driver comprises:
calculating, by the computer simulator, an average and a standard deviation of each feature of the data including the weighted time, the per-pixel average brightness, the temperature and the applied data voltage in a MGD (Multivariate-Gaussian Distribution) scheme;
calculating, by the computer simulator, a relationship between the features as covariance using the average and the standard deviation of each feature;
applying, by the computer simulator, a wight to each feature based on the calculated relationship to construct an n-dimensional multivariate Gaussian distribution; and
generating, by the computer simulator, new data such that the newly generated data complies with the n-dimensional multivariate Gaussian distribution.

15. The method of claim 11, wherein learning, by the computer simulator, the weighted time, the per-pixel average brightness, the temperature, and the applied data voltage in a deep learning manner comprises:
learning, by the computer simulator, the weighted time, the per-pixel average brightness, the temperature, and the applied data voltage in the deep learning manner, while controlling a distribution of input data to each layer using batch normalization, in a dropout scheme that does not use a node between layers randomly, and while reducing a parameter value using regularization to control complexity.

* * * * *